G. F. McDONNELL AND J. J. DANDOY.
GLASS VESSEL.
APPLICATION FILED FEB. 13, 1919.

1,348,231.

Patented Aug. 3, 1920.

Inventors:
George F. McDonnell,
John Joseph Dandoy
By
Attorney.

UNITED STATES PATENT OFFICE.

GEORGE F. McDONNELL, OF CHARLESTON, AND JOHN JOSEPH DANDOY, OF DUNBAR, WEST VIRGINIA.

GLASS VESSEL.

1,348,231.                    Specification of Letters Patent.    Patented Aug. 3, 1920.

Application filed February 13, 1919. Serial No. 276,767.

*To all whom it may concern:*

Be it known that we, GEORGE F. McDONNELL and JOHN JOSEPH DANDOY, citizens of the United States, residing, respectively, at Charleston and at Dunbar, in the county of Kanawha and State of West Virginia, have jointly invented certain new and useful Improvements in Glass Vessels, of which the following is a specification.

It is the object of our invention to provide new and improved means whereby to so construct a glass vessel as to have embodied in it positioning recesses for receiving bent ends of a wire structure which are presented toward each other, and made in such manner that the parts forming the recesses may be formed on the mold faces in which the glass is blown and thus avoid movable parts in the mold, the glass vessel being so constructed as to readily receive the bent ends of the wire structure so as to limit upward movement of the same on the glass vessel; and, further to provide new and simple structures whereby to readily seal the contents in the glass vessel by simple means which are readily assembled.

The invention will be further readily understood from the following description and claims, and from the drawings, in which latter:

Figure 1:
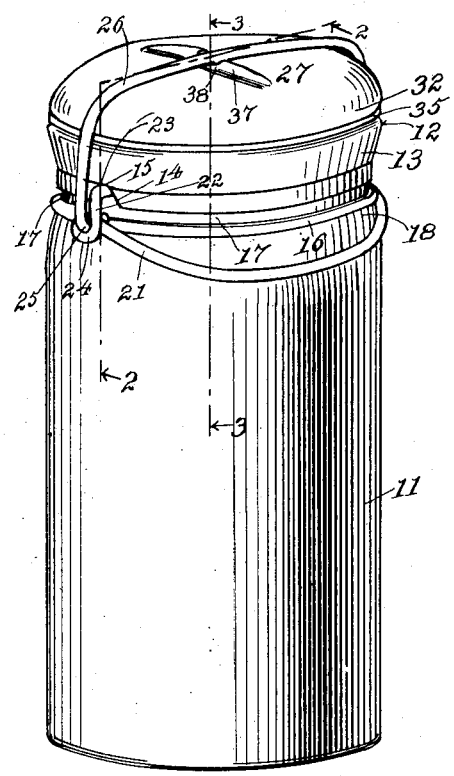
Figure 1 is a perspective view of our invention, as applied to a glass jar, with the top thereof clamped in place.
Figure 2:
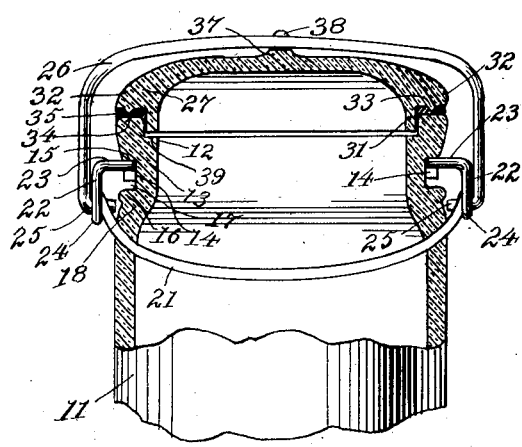
Fig. 2 is a cross-section of our improved device, taken on the line 2—2 of Fig. 1.
Figure 3:
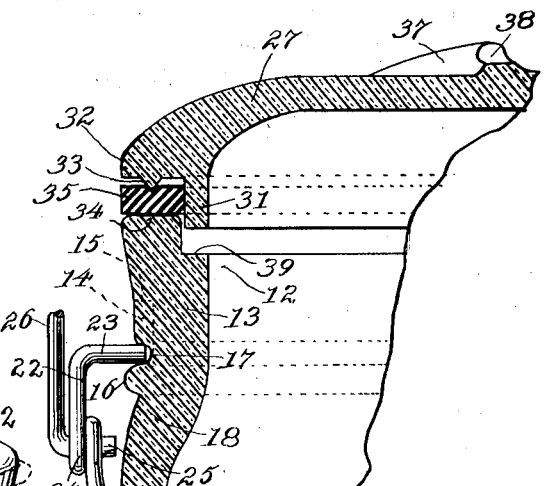
Fig. 3 is an enlarged detail in cross-section taken in the plane of the line 3—3 of Fig. 1, showing the radially inwardly extending end of the lever-wire received in the annular groove preparatory to being moved into the pivot recess; and, Fig. 4 is a perspective view of our invention, showing a modification as applied to a wide-mouthed milk jar.

The glass vessel is exemplified as a wide-mouthed jar for receiving either liquid or solid food, pickled or preserved vegetables or fruits, milk, or other contents, for use in the household or by packers.

The body 11 of the jar is exemplified as having substantially straight cylindrical sides. The jar is provided with a wide mouth 12, so arranged as to provide ready access into the interior of the jar for inserting or removing contents and for cleaning purposes.

The jar is, at its mouth-end, provided with an annular substantially thick glass ring 13 which is integral with the body. The ring is provided with opposite downwardly opening recesses 14, which extend upwardly into said ring, the walls of said recesses approaching each other, whereby the recesses contract upwardly, for forming an upper positioning wall 15. The jar is further provided with an annular bead 16 which is integral with the jar and is located below and slightly spaced from the lower edge of the annular thickened glass ring. Annular grooves 17, 17, are thereby formed between the lower edges of the ring and the bead. The ring and bead are located on the neck-portion 18 of the body. The parts are preferably so formed that the outer diameters of the glass ring and the body are equal or in line with each other, so that the jars may be set close together in stacking or packing the same.

A wire structure, exemplified as a lever-wire 21, is preferably of bow-shape, for instance, provided with side arms 22, the inner ends 23 of which are bent toward each other, so that when positioned about the jar the said inner ends extend radially inward with relation to the jar. The side arms may be provided with pivot-loops 24. The inwardly extending ends 23 form pivots for the lever-wire, whereas the pivot-loops 24 form bearings for the pivot ends 25 of a clamp-wire 26, the clamp-wire being arranged to be received about the top 27 of the jar, the downward movement of the outer end of the pivot-wire causing clamping action on the clamp-wire for pressing the top in place on the body of the jar.

The diameters of the inner ends of the pivot ends of the pivot-wire are preferably greater than the bottoms of the annular grooves 17, the said ends, however, being readily received in said grooves for being guided thereby into the recesses 14, the lower ends of which recesses open downwardly into said grooves. In assembling the parts, the inner ends of the wire-structure are received in said grooves, the wire-structure being then pushed toward the jar, whereby said inner ends are caused to pass along said grooves, being guided by the walls thereof into said recesses, the said ends snapping into said recesses when the recesses are reached by said ends.

The top is provided with a downwardly extending or depending annular flange 31, at the upper end of which the top is provided with a laterally radially extending flange 32. The annular depending flange is received within the inner wall of the mouth end of the jar. The radially outwardly extending flange is, intermediate of its inner and outer boundaries, provided with an annular downwardly extending bead 33. The latter bead coacts with the top edge 34 of the jar, which is shown flat throughout a substantial portion of its width. A closure-ring 35, shown as a rubber gasket, is received about the downwardly extending annular flange 31, and is held thereby on the top, so as to be placed on the top edge of the jar when the top is positioned on the jar, and to be removed with the top when the top is removed.

The closure-ring is pressed between the annular bead 33 and the upper edge of the jar, when the clamp-ring is received over the upper face of the jar and the lever-wire is depressed. The annular closure-ring or washer extends both to inside and to outside of said annular bead when the parts are in position of use. The top may be provided with a central ridge 37, having a positioning notch 38 therein, in which the clamp-wire is arranged to be received.

The inner wall of the mouth-end of the jar is preferably provided with an annular shoulder 39 below the lower end of the depending annular flange 31 when the top is located on the body.

Figure 4:
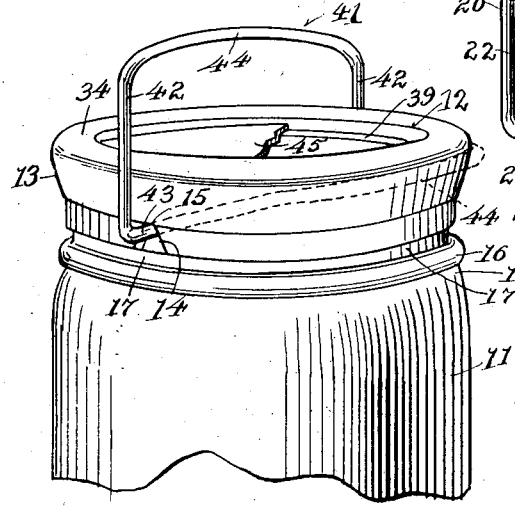

We have, in Fig. 4, shown a modification of the wire-structure. In this instance the wire-structure is formed as a carrying bail 41, bent to form side arms 42, the inner ends of which are bent toward each other so as to form radially inwardly projecting ends 43. The extreme ends of the latter are arranged to be received in the annular grooves 17 and to be passed therealong so as to be received in the recesses 14, and to spring inwardly into said recesses when said recesses are reached.

The inwardly projecting radially extending inner ends of the wire-structures press inwardly with relation to the wall of the jar, due to the resilience of the wire and the form into which the same have been bent. When pouring the contents, the bail is swung backwardly, its cross-stretch 44 being pushed past the edge of the mouth of the jar, but impinging said edge, so as to be held out of the way of the stream of contents being poured.

A suitable cap 45, for instance a fiber cap, or a paper cap, propery paraffined, may be received across the mouth of the jar on the annular shoulder 39, for closing the same.

The construction stated presents indentations and protuberances in the glass which are readily formed by solid parts formed in the molding faces of the mold in which the jar is blown, and forms a construction of jar which is reinforced at its mouth-end, presents a closure provided with a clamping bead between the outer edge of an outwardly extending lateral flange and a depending annular flange, so as to avoid chipping of and damage to the bead, and provides an end-face for the mouth-end of the jar which serves as an excellent pouring surface and presents a substantial flat face to the bead.

Having thus fully described our invention, what we claim as new and desire to secure by Letters Patent, is:

1. In a jar of the character described, the combination of a body provided with a wide mouth having an annular thickened glass ring at said mouth integral with said body, opposite downwardly open recesses extending upwardly into said thickened glass ring, said recesses contracting toward their upper ends and open radially outward, and a bead integral with said body located below and slightly spaced from the lower edge of said annular thickened glass ring forming annular spaces at opposite sides of said body between said annular thickened glass ring and said bead, the bottoms of said annular spaces being concentric with the axis of said body, forming guiding channels concentric with said axis, said guiding channels merging into said recesses to guide the inwardly presented inwardly pressing ends of a wire structure received against said bottoms, in said annular spaces about said body and into said recesses, whereby said upwardly contracting walls of said recesses hold said inwardly presented inwardly pressing ends of said wire structure against upward movement on said body.

2. In a glass vessel of the character described, the combination of the body provided with a mouth having an annular thickened glass ring at said mouth integral with said body, and opposite downwardly open recesses extending upwardly into said thickened glass ring, said recesses contracting toward their upper ends and open radially outward, a lever-wire having inwardly presented inwardly pressing ends, said body provided with a bead integral with said body located below and slightly spaced from the lower edge of said annular thickened glass ring, forming annular spaces at opposite sides of said body between said annular thickened glass ring and said bead, the bottoms of said annular spaces being concentric with the axis of said body, forming guiding channels concentric with said axis, said guiding channels merging into said recesses to guide said inwardly presented inwardly pressing ends against said bottoms about said body into said recesses, a top for said body, said top having an annular depending flange received in the mouth of said body and a flange extending radially outward from the top of said annular depending flange, said radially outwardly extending flange provided with a depending annular bead coacting with the upper edge of the mouth of said body whereby to clamp a closure-ring between said bead and said upper edge, and a clamp-wire pivoted to said lever-wire, said upwardly contracting walls of said recesses arranged to hold said inwardly presented inwardly pressing ends of said lever-wire against upward movement on said body.

In testimony whereof we have hereunto signed our names in the presence of two subscribing witnesses.

GEORGE F. McDONNELL.
JOHN JOSEPH DANDOY.

Witnesses:
 AMOS REED,
 H. C. PETERSON.